(12) United States Patent
Ye

(10) Patent No.: US 9,351,214 B2
(45) Date of Patent: May 24, 2016

(54) METHOD OF PERFORMING CELL RESELECTION PROCEDURE IN WIRELESS COMMUNICATION SYSTEM

(71) Applicant: ACER INCORPORATED, New Taipei (TW)

(72) Inventor: Shiang-Rung Ye, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

(21) Appl. No.: 14/714,340

(22) Filed: May 17, 2015

(65) Prior Publication Data

US 2016/0029276 A1    Jan. 28, 2016

Related U.S. Application Data

(60) Provisional application No. 62/028,792, filed on Jul. 24, 2014.

(30) Foreign Application Priority Data

Dec. 18, 2014  (TW) .............................. 103144372 A

(51) Int. Cl.
*H04W 36/30* (2009.01)
*H04W 36/14* (2009.01)
(Continued)

(52) U.S. Cl.
CPC ............ *H04W 36/165* (2013.01); *H04W 36/24* (2013.01)

(58) Field of Classification Search
CPC ............ H04W 36/30; H04W 36/0055; H04W 36/0061; H04W 36/0083; H04W 36/06; H04W 36/165; H04W 36/124

USPC ........ 455/67.11, 435.2, 436, 437, 438, 456.1; 370/252, 331, 332

See application file for complete search history.

(56) References Cited

U.S. PATENT DOCUMENTS

2005/0079870 A1   4/2005   Rick
2006/0035662 A1   2/2006   Jeong
(Continued)

FOREIGN PATENT DOCUMENTS

EP        2 200 374 A1    6/2010
WO      2008157713 A1   12/2008

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 10), 3GPP TS 36.304 V10.8.0, Mar. 2014, pp. 1-33, XP050905168, 3GPP, Valbonne, France.

(Continued)

*Primary Examiner* — Inder Mehra
(74) *Attorney, Agent, or Firm* — Winston Hsu; Scott Margo

(57) ABSTRACT

When camping on a serving cell which is not barred from cell selection/reselection, a user equipment is configured to evaluate whether a cell reselection procedure should be performed based on first cell reselection criterion. If the serving cell is barred from cell selection/reselection by the network when the user equipment is currently camping on the serving cell, the user equipment is configured to evaluate whether the cell reselection procedure should be performed based on a second cell reselection criteria. The judging conditions of the second cell reselection criterion are less strict than the judging conditions of the first cell reselection criterion.

9 Claims, 1 Drawing Sheet

(51) Int. Cl.
*H04W 36/16* (2009.01)
*H04W 36/24* (2009.01)

(56) References Cited

U.S. PATENT DOCUMENTS

2014/0045498 A1* 2/2014 Choi ................ H04W 36/32
455/436
2014/0086208 A1 3/2014 Murray

OTHER PUBLICATIONS

Digital cellular telecommunications system (Phase 2+); Functions related to Mobile Station (MS) in idle mode and group receive mode (GSM 03.22 version 8.3.0 Release 1999), ETSI TS 100 930 V8.3.0, Apr. 2000, pp. 1-22, XP050357832, ETSI, France.

3rd Generation Partnership Project; Technical Specification Group Radio Access Network; User Equipment (UE) procedures in idle mode and procedures for cell reselection in connected mode (Release 12), 3GPP TS 25.304 V12.5.0, Mar. 2015, pp. 1-58, XP050952058, 3GPP, Valbonne, France.

3GPP TS 36.304 V12.1.0 (Jun. 2014), 3rd Generation Partnership Project, Technical Specification Group Radio Access Network; Evolved Universal Terrestrial Radio Access (E-UTRA); User Equipment (UE) procedures in idle mode (Release 12), cover page, p. 26-27.

* cited by examiner

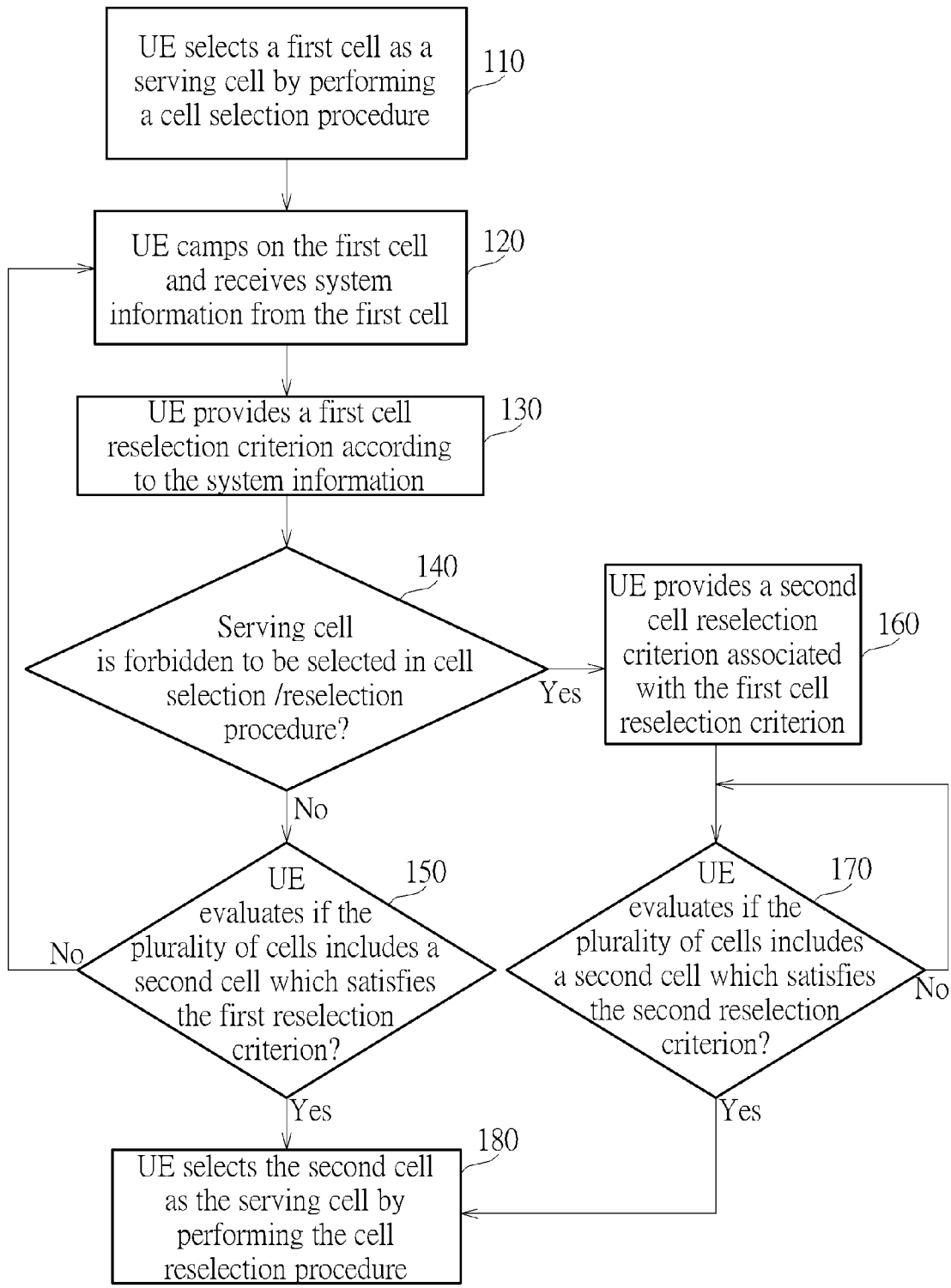

METHOD OF PERFORMING CELL RESELECTION PROCEDURE IN WIRELESS COMMUNICATION SYSTEM

CROSS REFERENCE TO RELATED APPLICATIONS

This application claims the benefit of U.S. provisional application No. 62/028,792 filed on Jul. 24, 2014.

BACKGROUND OF THE INVENTION

1. Field of the Invention

The present invention is related to a method of performing cell reselection procedure in wireless communication system, and more particularly, to a method of performing cell reselection procedure in wireless communication system when a serving cell becomes barred.

2. Description of the Prior Art

The 3rd Generation Partnership Project (3GPP) has developed various wireless communication networks. A universal mobile telecommunications system (UMTS) or a global system for mobile communications edge radio access network (GERAN) is a $3^{rd}$ generation (3G) network which adopts a wideband code division multiple access (WCDMA) technology capable of providing high frequency spectrum utilization, universal coverage, and high-speed/quality multimedia data transmission. In the UMTS network, a radio access network known as a universal terrestrial radio access network (UTRAN) includes multiple cells, commonly known as Node-Bs (NBs), for communicating with multiple user equipment (UE). A long-term evolution (LTE) system is a $4^{th}$ generation (4G) network which includes a new radio interface and radio network architecture capable of providing a high data rate, low latency, packet optimization, and improved system capacity and coverage. In the LTE network, a radio access network known as an evolved UTRAN (E-UTRAN) includes multiple evolved NBs (eNBs) for communicating with multiple UEs and a core network which includes a mobility management entity (MME), a serving gateway and other devices for NAS (Non Access Stratum) control.

According to 3GPP specifications, after selecting a public land mobile network identity (PLMN), the UE may perform a cell selection procedure and a cell reselection procedure in order to use related network services. The cell selection procedure allows the UE to quickly camp on a serving cell, thereby receiving system information from the PLMN, establishing radio resource control (RRC) links, accessing network via control channels, and receiving/replying paging messages. The cell reselection procedure allows the UE to camp on another target cell having better signal quality than the current serving cell.

After finishing the cell selection procedure, the UE may continuously receive system information from the serving cell, thereby acquiring cell reselection criteria, a list of frequency/radio access technology (RAT) and status information, based on which it may be determined if another target cell having better signal quality exists. Whether the cell reselection procedure should be performed may be determined according to the evaluations on Intra-frequency reselection and Inter-frequency reselection which adopt different parameters as the cell reselection criteria. The evaluation on Intra-frequency reselection uses cell signal strength as a judging condition. If the signal strength of an Intra-frequency target cell remains stronger than the signal strength of an Intra-frequency serving cell longer than a reselection timer value $Treselection_{RAT}$, the UE may handover to camp on the target cell by performing the cell reselection procedure.

Each frequency/RAT in the frequency/RAT list is prioritized, and the evaluation on Inter-frequency reselection uses cell signal strength and reselection priority as judging conditions. If the signal strength of a high-priority Intra-frequency target cell remains larger than a first threshold value longer than the reselection timer value $Treselection_{RAT}$, the UE may handover to camp on the target cell by performing the cell reselection procedure. If the signal strength of a low-priority Intra-frequency target cell remains larger than a second threshold value longer than the reselection timer value $Treselection_{RAT}$ and the signal strength of the serving cell remains smaller than a third threshold value longer than the reselection timer value $Treselection_{RAT}$, the UE may handover to camp on the target cell by performing the cell reselection procedure. The same-priority Inter-frequency cell reselection may be performed in the same manner as the Intra-frequency cell reselection.

According to related 3GPP specifications (such as TS 36.304), the cells in a wireless communication system may be categorized as suitable cells, acceptable cells, barred cells or reserved cells according to service limitations. The UE may acquire the types of the cells from the status information of a system information block 3 (SIB3) or a system information block 4 (SIB4). According to related 3GPP specifications (such as TS 36.304), the UE is not allowed to camp on a barred cell or on a reserved cell. Therefore, the cell selection procedure and the cell reselection procedure can only be performed on suitable cells or acceptable cells. However, although a serving cell selected by a specific UE during a previous cell selection procedure was a suitable cell or an acceptable cell, the network may somehow set the serving cell as a barred cell or a reserved cell when the UE is currently camping on the serving cell. After that, all other UEs are forbidden to camp on the barred serving cell of the specific UE. Setting the serving cell as a suitable cell, an acceptable cell, a barred cell or a reserved cell does not influence the signal strength of the serving cell. When the UE detects another low-priority Intra-frequency, the signal strength of the serving cell may always remain larger than the third threshold value even if the signal strength of the low-priority Intra-frequency target cell remains larger than the second threshold value longer than the reselection timer value $Treselection_{RA}$. Under such circumstance when the serving cell becomes a barred cell, the prior art UE may not be able to handover to camp on the target cell by performing the cell reselection procedure. Therefore, there is a need for a method of performing cell reselection procedure in wireless communication system when a serving cell becomes barred.

SUMMARY OF THE INVENTION

The present invention provides a method of performing a cell reselection procedure in a wireless communication system which includes a user equipment and a plurality of cells. The method includes the user equipment camping on a first cell among the plurality of cells; the user equipment evaluating if the plurality of cells includes a second cell which satisfies a first cell reselection criterion when camping on the first cell if it is determined that the first cell is allowed to be selected in the cell reselection procedure or in a cell selection procedure; the user equipment evaluating if the plurality of cells includes a third cell which satisfies a second cell reselection criterion when camping on the first cell if it is determined that the first cell is forbidden to be selected in the cell reselection procedure or in the cell selection procedure. The first cell reselection criterion includes at least one first judging condition for determining if the second cell satisfies the first cell reselection criterion. The second cell reselection criterion includes at least one second judging condition for determining if the third cell satisfies the second cell reselection criterion. The at least one second judging condition is less strict than the at least one first judging condition.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a flowchart illustrating a method of performing cell reselection procedure in a wireless communication system according to an embodiment of the present invention.

DETAILED DESCRIPTION

The present method of performing cell reselection procedure may be applied to a wireless communication system which includes a UE and a plurality of cells. Each cell may be an NB of a UTRAN, an e-NB of a EUTRAN, or a base station of another type of network. The UE may include any device with telecommunication capabilities, such as mobile phones, personal digital assistants, handheld computers, tablet computers, nettop computers, or laptop computers. However, the types of the cells and the UE do not limit the scope of the present invention.

The FIGURE is a flowchart illustrating a method of performing cell reselection procedure in a wireless communication system according to an embodiment of the present invention. The method in The FIGURE includes the following steps:

Step 110: the UE selects a first cell from the plurality of cells as a serving cell by performing a cell selection procedure; execute step 120.

Step 120: the UE camps on the first cell and receives system information from the first cell; execute step 130.

Step 130: the UE provides a first cell reselection criterion according to the system information; execute step 140.

Step 140: the UE determines if the serving cell is forbidden to be selected in the cell selection procedure or in the cell reselection procedure according to the system information; if yes, execute step 160; if no execute step 150.

Step 150: the UE evaluates if the plurality of cells includes a second cell which satisfies the first reselection criterion; if yes, execute step 180; if no, execute step 120.

Step 160: the UE provides a second cell reselection criterion associated with the first cell reselection criterion, wherein the judging conditions of the second cell reselection criterion are less strict than the judging conditions of the first cell reselection criterion; execute step 170.

Step 170: the UE evaluates if the plurality of cells includes a second cell which satisfies the second reselection criterion; if yes, execute step 180; if no, execute step 170.

Step 180: the UE selects the second cell as the serving cell by performing the cell reselection procedure; execute step 120.

According to related 3GPP specifications (such as TS 36.304), the cell selection procedure includes two stages: target cell decision and serving cell decision. During the first stage of target cell decision, the UE may select the target cell according its PLMN identification list, stored cell information or the list of scanned neighboring cells. If all scanned neighboring cells are not included in the UE's PLMN identification list or no smart card is inserted, the UE is configured to select the target cell based on signal strength. After selecting the target cell, the UE may start to receive the system information from the target cell and process the system information. The system information may include parameters ($Q_{rxlevmeas}$, $Q_{qualmeas}$, $Q_{rxlevmin}$, $Q_{qualmin}$, $Q_{rxlevminoffset}$, $Q_{qualminoffset}$, $P_{compensation}$) or threshold values ($Thresh_{Serving, LowQ}$, $Thresh_{Serving, LowP}$, $Thresh_{X, LowQ}$, $Thresh_{X, LowQ}$). Based on these parameters and threshold values, the UE may calculate the parameters of Srxlev and Squal, and acquire corresponding cell selection/reselection criteria. Srxlev represents a cell selection RX level value, and Squal represents a cell selection quality value. $Q_{rxlevmeas}$ represents a measured cell RX level value or a reference signal receiving power (RSRP). $Q_{qualmeas}$ represents a measured cell quality value or a reference signal receiving quality (RSRQ). $Q_{rxlevmin}$ represents a minimum required RX level in the cell. $Q_{qualmin}$ represents a minimum required quality level in the cell. $Q_{rxlevminoffset}$ represents an offset taken into account in the Srxlev evaluation as a result of a periodic search for a higher priority PLMN. $Q_{qualminoffset}$ represents an offset taken into account in the Squal evaluation as a result of a periodic search for a higher priority PLMN. $P_{compensation}$ represents the larger one among ($P_{EMAX}-P_{PowerClass}$) and 0, wherein $P_{EMAX}$ represents the maximum transmission power of the UE and $P_{PowerClass}$ represents the maximum radio frequency output power of the UE. $Thresh_{Serving, LowQ}$ and $Thresh_{Serving, LowP}$ represent low threshold values required for evaluating reselection of the serving frequency. $Thresh_{X, LowQ}$ and $Thresh_{X, LowP}$ represent threshold values required for reselecting low-priority frequency.

The decibel (dB) is the unit of Srxlev and Squal which are represented by the following equations:

$$Srxlev = Q_{rxlevmeas} - (Q_{rxlevmin} + Q_{rxlevminoffset}) - P_{compensation} \quad (1)$$

$$Squal = Q_{qualmeas} - (Q_{qualmin} + Q_{qualminoffset}) \quad (2)$$

During the second stage of serving cell decision, the UE may determine if the target cell is a suitable cell based on the cell selection criteria which are included in the system information provided by the target cell. The cell selection criteria include judging conditions associated with signal receiving threshold (such as Srxlev and/or Squal) and status information indicated in the system information. The following equation (3) represents a cell selection criterion S1 used for frequency division duplex (FDD) structure. The following equation (4) represents a cell selection criterion S2 used for time division duplex (TDD) structure.

$$S1: Srxlev>0 \text{ and } Squal>0 \quad (3)$$

$$S2: Srxlev>0 \quad (4)$$

For illustrative purpose, it is assumed that the first cell is selected in the first stage, the signal strength of the first cell is determined to be larger than a signal receiving threshold (such as when the cell selection criterion S1 or S2 is satisfied) in the second stage, and the first cell is allowed to be selected in the cell selection procedure or in the cell reselection procedure according to the status information. Under such circumstance, the UE may select the first cell as the serving cell in step 110.

In step 120, the UE may camp on the first cell and receives system information from the first cell and continuously receive cell reselection criteria, frequency list and status information from the serving cell, thereby performing the evaluation of the cell reselection procedure accordingly.

According to the cell reselection criteria defined in related 3GPP specifications (such as TS 36.304), the following equations (5)-(7) illustrate cell reselection criteria R1-R3 used for low-priority Inter-frequency under various structure.

R1: serving cell's Squal<$Thresh_{Serving, LowQ}$; and target cell's Squal>$Thresh_{X, LowQ}$ (5)°

R2: serving cell's Squal<$Thresh_{Serving, LowQ}$; and target cell's Srxlev>$Thresh_{X, LowP}$ (6)°

R3: serving cell's Srxlev<$Thresh_{Serving, LowP}$; and target cell's Srxlev>$Thresh_{X, LowP}$ (7)°

In step 130, the first cell reselection criterion provided by the UE may be any of the cell reselection criteria R1-R3. If the threshold value $Thresh_{Serving, LowQ}$ is included in the SIB3 broadcast by the serving cell, the UE may perform cell reselection evaluation on the RAT/frequency of a low-priority EUTRAN or a low-priority UTRAN FDD using the cell reselection criterion R1, or perform the cell reselection evaluation on the RAT/frequency of a low-priority UTRAN TDD, a low-priority Global System for Mobile Communications Enhanced Data rates for GSM Evolution Radio Access Network (GERAN), or a low-priority Code Division Multiple Access (CDMA) 200. If the threshold value $Thresh_{Serving, LowQ}$ is not included in the SIB3 broadcast by the serving cell, the UE may perform cell reselection evaluation on a low-priority RAT/frequency using the cell reselection criterion R3. However, the types and execution of the first cell reselection criterion do not limit the scope of the present invention.

As previously illustrated, although the UE is allowed to select the first cell as the serving cell in step 110, the network may somehow change the status information of the first cell while the UE is camping on the first cell. For example, the status information indicated in SIB3 or SIB4 broadcast by the first cell includes information elements (IE) of "cell barred", "cell reserved for operator use" and "cell reservation on extension". The IE type of "cell barred" may be set in a "barred" state or a " not barred" state. The IE type of "Cell reserved for operator use" and "cell reservation on extension" may be set in a "reserved" state or in a "not reserved" state. If the network allows the first cell to provide normal service, the above-mentioned IEs may be set in the "not barred" state or in the "not reserved" state; if the network does not want any UE to camp on the first cell, the above-mentioned IEs may be set in the "barred" state or in the "reserved" state.

If the UE determines that the serving cell is not forbidden to be selected in the cell selection procedure or in the cell reselection procedure according to the system information in step 140, step 150 is then executed for evaluating if the plurality of cells includes the second cell which satisfies the first reselection criterion. If the second cell exists, step 180 is then executed for selecting the second cell as the serving cell by performing the cell reselection procedure. If the UE determines that the serving cell is forbidden to be selected in the cell selection procedure or in the cell reselection procedure according to the system information in step 140, step 160 is then executed.

In step 160, the UE may provide the second cell reselection criterion associated with the first cell reselection criterion, wherein the judging conditions of the second cell reselection criterion are less strict than the judging conditions of the first cell reselection criterion. In an embodiment, the second cell reselection criterion provided in step 160 may be any of the following cell reselection criteria A1-A3, as represented by equations (8)-(10). Each cell reselection criterion is deemed satisfied when all judging conditions hold true longer than the reselection timer value $Treselection_{RAT}$.

A1: target cell's Squal>$Thresh_{X, LowQ}$ (8)

A2: target cell's Srxlev>$Thresh_{X, LowP}$ (9)

A3: target cell's Srxlev>$Thresh_{X, LowP}$ (10)

In another embodiment, the second cell reselection criterion provided in step 160 may be any of the following cell reselection criteria B1-B3, as represented by equations (11)-(13). Each cell reselection criterion is deemed satisfied when all judging conditions hold true longer than the reselection timer value $Treselection_{RAT}$.

B1: serving cell's Squal<MAX1; and target cell's Squal>$Thresh_{X, LowQ}$ (11)

B2: serving cell's Squal<MAX1; and target cell's Srxlev>$Thresh_{X, LowP}$ (12)

R3: serving cell's Srxlev<MAX2; and target cell's Srxlev>$Thresh_{X, LowP}$ (13)

If it is determined in step 140 that the serving cell is forbidden to be selected in the cell selection procedure or in the cell reselection procedure, the UE may evaluate if the plurality of cells includes the second cell which satisfies the second reselection criterion step 160. If the second cell reselection criterion provided is one of the cell reselection criteria A1-A3, Squal or Srxlev of the serving cell is ignored during the reselection evaluation of low-priority RAT/frequency. In other words, the judging conditions for determining if the cell reselection criteria A1-A3 are satisfied are less strict than the judging conditions for determining if the cell reselection criteria R1-R3 are satisfied. Therefore, even if the Squal of the barred serving cell is larger than $Thresh_{Serving, LowQ}$ or the Srxlev of the barred serving cell is larger than $Thresh_{Serving, LowP}$, the UE may still perform the cell reselection procedure for selecting the second cell as the serving cell in step 180 as long as the second cell satisfies Squal>$Thresh_{X, LowQ}$ or Srxlev>$Thresh_{X, LowP}$.

If the second cell reselection criterion provided is one of the cell reselection criteria B1-B3, a threshold value MAX1 or MAX2 is used during the reselection evaluation of low-priority RAT/frequency, wherein MAX1>$Thresh_{X, LowQ}$ and MAX2>$Thresh_{X, LowP}$. In other words, the judging conditions for determining if the cell reselection criteria B1-B3 are satisfied are less strict than the judging conditions for determining if the cell reselection criteria R1-R3 are satisfied. Therefore, when the second cell satisfies Squal>$Thresh_{X, LowQ}$ Srxlev>$Thresh_{X, LowP}$, it is easier for the serving cell to satisfy Squal<MAX1 or Srxlev<MAX2 so that the UE may perform the cell reselection procedure for selecting the second cell as the serving cell in step 180.

After a UE selects a suitable cell or an acceptable cell as the serving cell, the network may somehow set the serving cell as a barred cell or a reserved cell when the UE is currently camping on the serving cell. In the cell reselection method according to the present invention, the UE may adopt cell reselection criteria with less strict judging conditions for determining if the cell reselection procedure should be perform. Therefore, the present invention can enhance the chance for the UE currently camping on a barred serving cell to handover to another suitable cell or acceptable cell, thereby improving communication quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a cell reselection procedure in a wireless communication system which includes a user equipment and a plurality of cells, the method comprising:
   the user equipment camping on a first cell among the plurality of cells;
   the user equipment evaluating if the plurality of cells includes a second cell which satisfies a first cell reselection criterion when camping on the first cell if it is determined that the first cell is allowed to be selected in the cell reselection procedure or in a cell selection procedure;
   the user equipment evaluating if the plurality of cells includes a third cell which satisfies a second cell reselection criterion when camping on the first cell if it is determined that the first cell is forbidden to be selected in the cell reselection procedure or in the cell selection procedure, wherein:
      the first cell reselection criterion includes at least one first judging condition for determining if the second cell satisfies the first cell reselection criterion;
      the second cell reselection criterion includes at least one second judging condition for determining if the third cell satisfies the second cell reselection criterion; and
      the at least second second judging condition is less strict than the at least one first judging condition.

2. The method of claim 1, further comprising:
   the user equipment receiving system information from the first cell when camping on the first cell; and
   the user equipment determining if the first cell is forbidden to be selected in the cell reselection procedure or in the cell selection procedure according to status information indicated in the system information.

3. The method of claim 2, wherein:
   the system information includes a "cell barred" information element, a "cell reserved for operator use" information element, and a "cell reservation on extension" information element defined in a 3rd Generation Partnership Project (3GPP) specification;
   the user equipment determines that the first cell is forbidden to be selected in the cell reselection procedure or in the cell selection procedure when one of the "cell barred" information element, the "cell reserved for operator use" information element, and the "cell reservation on extension" information element is set in a "barred" state or in a "reserved" state; and
   the user equipment determines that the first cell is allowed to be selected in the cell reselection procedure or in the cell selection procedure when all of the "cell barred" information element, the "cell reserved for operator use" information element, and the "cell reservation on extension" information element are set in a "not barred" state or in a "not reserved" state.

4. The method of claim 1, further comprising:
   the user equipment receiving system information containing a plurality of parameters and a plurality of threshold values from the first cell when camping on the first cell; and
   the user equipment acquiring a first cell selection quality value (Squal) associated with the first cell, a second Squal associated with the second cell, and a third Squal associated with the third cell according to the plurality of parameters, wherein:
      the plurality of parameters include a measured cell quality value ($Q_{qualmeas}$), a minimum required quality level in a cell ($Q_{qualmin}$), and an offset ($Q_{qualminoffset}$) taken into account in a Squal evaluation as a result of a periodic search for a higher priority public land mobile network identity (PLMN);
      the user equipment determines that the second cell satisfies the first cell reselection criterion when the first Squal remains smaller than a first threshold value and the second Squal remains larger than a second threshold value longer than a predetermined period of time; and
      the user equipment determines that the third cell satisfies the second cell reselection criterion when the third Squal remains larger than the second threshold value longer than the predetermined period of time.

5. The method of claim 1, further comprising:
   the user equipment receiving system information containing a plurality of parameters and a plurality of threshold values from the first cell when camping on the first cell; and
   the user equipment acquiring a first cell selection quality value (Squal) associated with the first cell, a second Squal associated with the second cell, and a third Squal associated with the third cell according to the plurality of parameters, wherein:
      the plurality of parameters include a measured cell quality value ($Q_{qualmeas}$), a minimum required quality level in a cell ($Q_{qualmin}$), and an offset ($Q_{qualminoffset}$) taken into account in a Squal evaluation as a result of a periodic search for a higher priority public land mobile network identity (PLMN);
      the user equipment determines that the second cell satisfies the first cell reselection criterion when the first Squal remains smaller than a first threshold value and the second Squal remains larger than a second threshold value longer than a predetermined period of time;
      the user equipment determines that the third cell satisfies the second cell reselection criterion when the first Squal remains smaller than a third threshold value and the third Squal remains larger than the second threshold value longer than the predetermined period of time; and
      the third threshold value is larger than the second threshold value.

6. The method of claim 1, further comprising:
   the user equipment receiving system information containing a plurality of parameters and a plurality of threshold values from the first cell when camping on the first cell; and
   the user equipment acquiring a cell selection quality value (Squal) associated with the first cell, a first cell selection RX level value (Srxlev) associated with the second cell, and a second Srxlev associated with the third cell according to the plurality of parameters, wherein:
      the plurality of parameters include a measured cell RX level value ($Q_{rxlevmeas}$), a measured cell quality value ($Q_{qualmeas}$), a minimum required RX level in a cell ($Q_{qualmin}$), a minimum required quality level in the cell ($Q_{qualmin}$), a first offset ($Q_{qualminoffset}$) taken into account in a Srxlev evaluation as a result of a periodic search for a higher priority public land mobile network identity (PLMN), a second offset ($Q_{qualminoffset}$) taken into account in a Squal evaluation as a result of a periodic search for the higher priority PLMN, a maximum transmission power of the user equipment ($P_{EMAX}$), and a maximum radio frequency output power of the user equipment ($P_{PowerClass}$);

the user equipment determines that the second cell satisfies the first cell reselection criterion when the Squal remains smaller than a first threshold value and the first Srxlev remains larger than a second threshold value longer than a predetermined period of time; and the user equipment determines that the third cell satisfies the second cell reselection criterion when the second Srxlev remains larger than the second threshold value longer than the predetermined period of time.

7. The method of claim 1, further comprising:

the user equipment receiving system information containing a plurality of parameters and a plurality of threshold values from the first cell when camping on the first cell; and the user equipment acquiring a cell selection quality value (Squal) associated with the first cell, a first cell selection RX level value (Srxlev) associated with the second cell, and a second Srxlev associated with the third cell according to the plurality of parameters, wherein:

the plurality of parameters include a measured cell RX level value ($Q_{rxlevmeas}$), a measured cell quality value ($Q_{qualmeas}$), a minimum required RX level in a cell ($Q_{rxlevmin}$), a minimum required quality level in the cell ($Q_{qualmin}$), a first offset ($Q_{rxlevminoffset}$) taken into account in a Srxlev evaluation as a result of a periodic search for a higher priority public land mobile network identity (PLMN), a second offset ($Q_{qualminoffset}$) taken into account in a Squal evaluation as a result of a periodic search for the higher priority PLMN, a maximum transmission power of the user equipment ($P_{EMAX}$), and a maximum radio frequency output power of the user equipment ($P_{PowerClass}$);

the user equipment determines that the second cell satisfies the first cell reselection criterion when the Squal remains smaller than a first threshold value and the first Srxlev remains larger than a second threshold value longer than a predetermined period of time;

the user equipment determines that the third cell satisfies the second cell reselection criterion when the Squal remains smaller than a third threshold value and the second Srxlev remains larger than the second threshold value longer than the predetermined period of time; and the third threshold value is larger than the second threshold value.

8. The method of claim 1, further comprising:

the user equipment receiving system information containing a plurality of parameters and a plurality of threshold values from the first cell when camping on the first cell; and the user equipment acquiring a first cell selection RX level value (Srxlev) associated with the first cell, a second Srxlev associated with the second cell, and a third Srxlev associated with the third cell according to the plurality of parameters, wherein:

the plurality of parameters include a measured cell RX level value ($Q_{rxlevmeas}$), a minimum required RX level in a cell ($Q_{rxlevmin}$), an offset ($Q_{rxlevminoffset}$) taken into account in a Srxlev evaluation as a result of a periodic search for a higher priority public land mobile network identity (PLMN), a maximum transmission power of the user equipment ($P_{EMAX}$), and a maximum radio frequency output power of the user equipment ($P_{PowerClass}$);

the user equipment determines that the second cell satisfies the first cell reselection criterion when the first Srxlev remains smaller than a first threshold value and the second Srxlev remains larger than a second threshold value longer than a predetermined period of time; and the user equipment determines that the third cell satisfies the second cell reselection criterion when the third Srxlev remains larger than the second threshold value longer than the predetermined period of time.

9. The method of claim 1, further comprising:

the user equipment receiving system information containing a plurality of parameters and a plurality of threshold values from the first cell when camping on the first cell; and the user equipment acquiring a first cell selection RX level value (Srxlev) associated with the first cell, a second Srxlev associated with the second cell, and a third Srxlev associated with the third cell according to the plurality of parameters, wherein:

the plurality of parameters include a measured cell RX level value ($Q_{rxlevmeas}$), a minimum required RX level in a cell ($Q_{rxlevmin}$), an offset ($Q_{rxlevminoffset}$) taken into account in a Srxlev evaluation as a result of a periodic search for a higher priority public land mobile network identity (PLMN), a maximum transmission power of the user equipment ($P_{EMAX}$), and a maximum radio frequency output power of the user equipment ($P_{PowerClass}$);

the user equipment determines that the second cell satisfies the first cell reselection criterion when the first Srxlev remains smaller than a first threshold value and the second Srxlev remains larger than a second threshold value longer than a predetermined period of time; and the user equipment determines that the third cell satisfies the second cell reselection criterion when the first Srxlev remains smaller than a third threshold value and the third Srxlev remains larger than the second threshold value longer than the predetermined period of time; and the third threshold value is larger than the second threshold value.

* * * * *